United States Patent [19]

Barnes

[11] Patent Number: 5,758,858
[45] Date of Patent: Jun. 2, 1998

[54] PARALLELING DEVICE AND METHOD OF USING

[76] Inventor: Renny H. Barnes, 8146 Crestridge Rd., Fairfax Station, Va. 22039

[21] Appl. No.: 616,403

[22] Filed: Mar. 15, 1996

[51] Int. Cl.⁶ .................................................. F16M 13/00
[52] U.S. Cl. .............................. 248/544; 33/369; 33/379; 248/475.1
[58] Field of Search .......................... 248/544; 33/369, 33/379, 370, 371, 526, 533

[56] References Cited

U.S. PATENT DOCUMENTS

| | | |
|---|---|---|
| 1,200,410 | 10/1916 | Chemrinsky .............. 33/370 |
| 3,321,615 | 5/1967 | Hilzen ........................ 240/3 |
| 3,422,544 | 1/1969 | Wyse . |
| 4,228,982 | 10/1980 | Sellera . |
| 4,578,989 | 4/1986 | Scott . |
| 4,804,161 | 2/1989 | Wallo . |
| 5,003,703 | 4/1991 | Swanson . |
| 5,080,317 | 1/1992 | Letizia . |
| 5,165,650 | 11/1992 | Letizia . |
| 5,267,719 | 12/1993 | Keller . |
| 5,303,895 | 4/1994 | Hart . |
| 5,328,139 | 7/1994 | Barnes . |
| 5,330,179 | 7/1994 | Hampel . |
| 5,425,524 | 6/1995 | Messina, Jr. . |

*Primary Examiner*—Alvin C. Chin-Shue
*Assistant Examiner*—Long Dinh Phan
*Attorney, Agent, or Firm*—Dickinson Wright PLLC

[57] ABSTRACT

A paralleling device comprises a thin sheet of material which is adapted to support a bubble level and be removably attached to a hanging wall article. The paralleling device can be used to parallel a wall article to be hung with the surface of an adjacent piece of furniture.

11 Claims, 2 Drawing Sheets

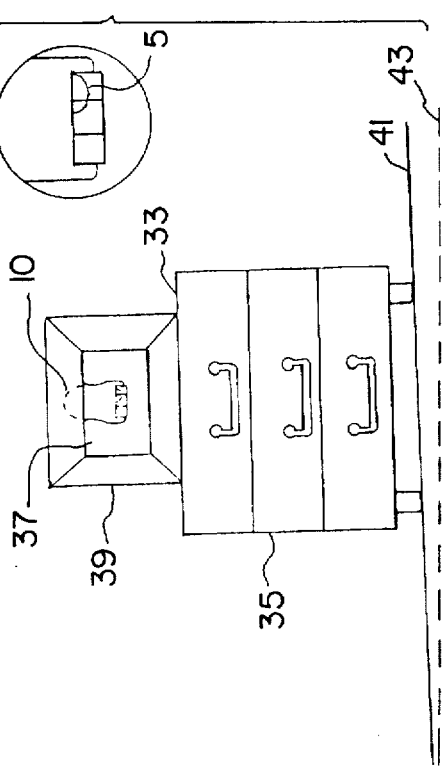
FIG. 3A
FIG. 3B
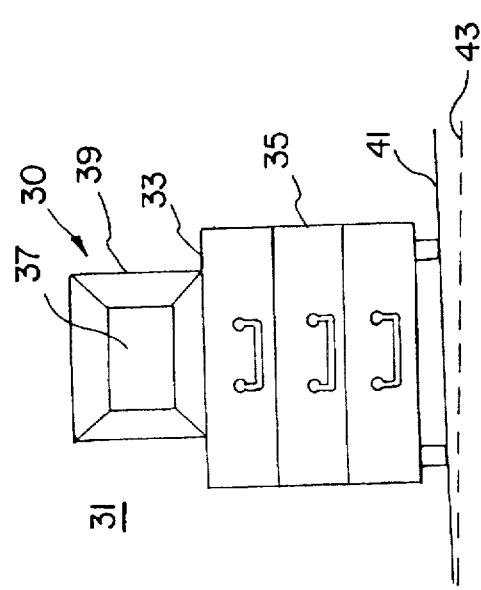
FIG. 3C
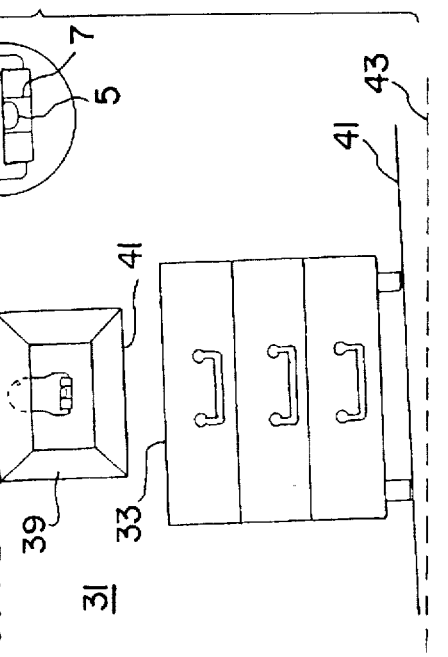
FIG. 3D
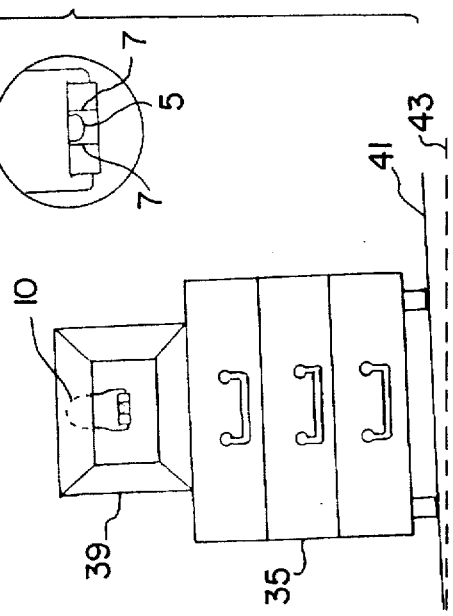

PARALLELING DEVICE AND METHOD OF USING

TECHNICAL FIELD

The present invention is directed to a device for paralleling an article to be hung on a wall surface with the surface of an adjacent piece of furniture.

BACKGROUND ART

In the prior art, it is well known to utilize a bubble level to assist in hanging pictures. U.S. Pat. Nos. 4,228,982 to Sellera, 5,080,317 and 5,165,650 to Letizia and 5,303,895 to Hart are examples of this prior art.

One of the drawbacks associated with utilizing these types of devices is the inability to level the picture with respect to an adjacent piece of furniture. When using these prior art hanging devices, the pictures are leveled to the horizon rather than the surrounding environment. Thus, if a picture is hung above a credenza and the floor supporting the credenza is not level, the leveled picture will not be parallel to the adjacent credenza. Consequently, when a person views both the credenza and the picture, either the picture or the credenza is slanted with respect to the other.

In view of this disadvantage, a need has developed to provide an improved method and device for paralleling picture frames when hung adjacent different pieces of furniture. The present invention provides a solution to this problem by providing both a method for paralleling a picture or other wall article to be hung with an adjacent piece of furniture and a paralleling device.

SUMMARY OF THE INVENTION

Accordingly, it is a first object of the present invention to provide a device for paralleling an article to be hung on a wall surface with an adjacent piece of furniture.

Another object of the present invention is to provide a method of paralleling a hung wall article to a piece of furniture.

A further object of the present invention is to provide a paralleling device which is sized in thickness to be inserted between the frame of a wall article and either the wall article itself or a covering thereof so that the paralleling device can be adjusted with respect to an adjacent piece of furniture.

A still further object of the present invention is to provide a leveling device which utilizes a bubble level retained along an outer edge thereof by a thin sheet material.

Other objects and advantages of the present invention will become apparent as a description thereof proceeds.

In satisfaction of the foregoing objects and advantages, the present invention comprises a paralleling device which includes a bubble level, a means for supporting the bubble level and means for removably inserting the supporting means between a wall article frame and a portion of one of the wall article and a covering of the wall article and for adjusting the bubble of the bubble level to a free floating stationary state which corresponds to the horizontal inclination of a surface of a piece of furniture so that the wall article frame can be parallel to the surface by mounting it on the wall surface above the piece of furniture.

Preferably, a thin sheet material is used to support the bubble, the thin sheet permitting the removable insertion and adjustment described above. The sheet material can have a cut out portion along an edge thereof, the cut off portion separating a pair of tabs. Each tab is sized to fit within a recess in each end of the cylindrical bubble level. The cut out portion also has a straight edge which assists in retaining the bubble in a stationary position between the tabs.

In the method aspect of the invention, a wall article is paralleled to the surface of a piece of furniture by using the paralleling device described above. More specifically, the paralleling device is first inserted between the wall article frame and a portion of the wall article or its covering. Usually, the paralleling device can be inserted between the frame and the glass pane covering the wall article. After insertion of the paralleling device adjacent the frame, the wall article is placed on the surface of the piece of furniture to be paralleled with and the paralleling device is adjusted so that the bubble therein is in a free flowing stationary state. Preferably, the bubble is adjusted so that it is between two sighting lines of the bubble level. With the paralleling device adjusted while still attached to the wall article frame, the wall article is then attached to the wall surface with the bubble maintained in the same free floating stationary state. With this methodology, no matter what the horizontal inclination of the piece of furniture that the wall article was set on, the wall article is parallel to the surface of the piece of furniture.

Of course, the paralleling device can also be used to merely level an object if so desired since it has at least one surface which is parallel to the level itself.

In a preferred mode, the paralleling device is used in connection with a wall article hanging device which does not require attaching anything to the wall surface first. By using this type of article, the wall article can merely be attached directly to the wall surface while maintaining the bubble in the bubble level in the proper stationary state.

BRIEF DESCRIPTION OF DRAWINGS

Reference is now made to the drawings of the invention wherein:

FIGS. 3a–3d depict a sequence of events which describe the inventive method.

Description of the Preferred Embodiments

Figure 1:
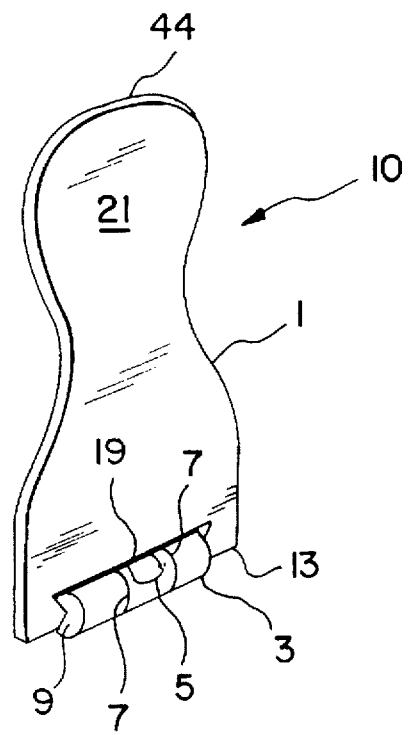
FIG. 1 is a perspective view of an exemplary embodiment of the inventive paralleling device.
Figure 2:
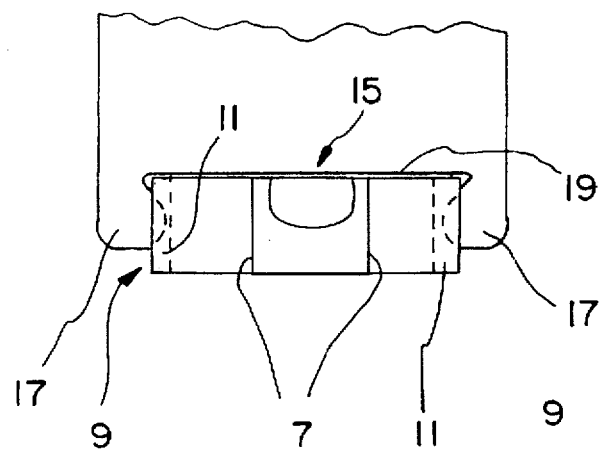
FIG. 2 an enlarged section of the device shown in FIG. 1.

Referring now to FIGS. 1 and 2, the inventive paralleling device, in one embodiment, is generally designated by reference numeral 10 and is seen to include a sheet 1 and a bubble level 3. The bubble level 3 includes a bubble 5, a pair of sighting lines 7 and ends 9. Each end 9 is slightly recessed to facilitate supporting the bubble level 3 by the sheet material 1. For this purpose, the sheet material is cut out along edge 13 thereof to form a cut out portion 15. The cut out portion separates a pair of tabs 17, each tab sized to fit within a respective recess 11. The distance between the tabs 17 is slightly less than the distance between the opposing faces of the recesses 11 so that the bubble level 3 is securely held in place.

The cut out portion 15 also includes a straight edge 19 which butts up against the bubble level 3 to assist in retaining it in place.

The sheet material 1 has an hour glass shape to facilitate its manipulation. However, other shapes could be used as would be within the skill of the art.

The sheet material 1 is also sized in thickness so that it can be easily inserted between a wall article frame and a wall article itself or the wall article covering, e.g. glass or the like.

The sheet material 1 should also be thin enough so that it can be easily inserted and removed and adjusted during the paralleling method to be described hereinafter. In a preferred embodiment, the sheet material is made of a flexible plastic material of about half a millimeter in thickness. In addition, the surface 21 of the sheet material 1, see FIG. 1, can include indicia thereon, for example, instructions on use.

Referring now to FIGS. 3a–3d, an exemplary use of the inventive paralleling device will now be described. In FIG. 3a, the intent is to hang the wall article 30 on the wall surface 31 above the top surface 33 of the piece of furniture 35 and parallel to the surface 32. The wall article 30 in this mode is in the form of a picture 37 surrounded by a picture frame 39.

The wall article 30 is first placed on the surface 33 and the paralleling device 10 is inserted such that an end thereof is positioned between the frame 39 and the picture 37.

Since the floor 41 is not level with respect to the true horizon line 43, the bubble 5 in the bubble level 3 floats to one end of the level, see FIG. 3b.

As shown in FIG. 3c, the paralleling device 10 is adjusted so that the bubble 5 is in a free floating state between the sighting lines 7. Of course, the bubble 5 may be adjusted in any position in the bubble level as long as it is free floating.

Once the bubble 5 is adjusted into a position which can be easily maintained when moving the wall article 30, the wall article 30 is then hung on the wall 31 as shown in FIG. 3d. The wall article 30 should be hung in an orientation which maintains the bubble 5 within the sighting lines 7. By maintaining the bubble 5 in FIG. 3d in the same position as shown in FIG. 3c, the lower edge 41 of the wall article 30 remains parallel to the upper surface 33 of the furniture 35. Thus, when a user views both the wall article 30 and the piece of furniture 35, they are parallel to each other in spite of the fact that the floor 41 is uneven. If one were to merely level the wall article 30 with respect to the true horizon line 43, the wall article 30 would be cockeyed with respect to the surface 33 and present an unpleasant scenario for a viewer.

Of course, the paralleling device 10 with flat upper edge 44 being parallel to the edge 19, see FIG. 1, could also be used as a levelling device for a picture by butting edge 43 against one of the horizontal members of the wall article. The wall article can then be adjusted so that the bubble 5 is between the sighting lines 7 and the wall article hung to make it truly level.

It should be understood that any wall article adapted for hanging on a wall surface can be used with the inventive paralleling device and method. A preferred use is for picture frames having glass coverings. However, other art work or the like where the paralleling device can be easily inserted or attached so as to be adjacent to a portion of the wall article and remain in place is adaptable for use with the invention.

In a more preferred mode of the invention, a wall article hanging device such as that disclosed in U.S. Pat. No. 5,328,139 (herein incorporated by reference in its entirety) can be used to hang the wall article 30. Since this wall article hanging device attaches to the wall article first, a user can easily adjust the wall article when hanging it on a wall so that the bubble of the bubble level remains in the correct position. Using this wall article hanging device, a user merely has to pick up the frame with both hands, adjust it so that the bubble is in the correct position and press the wall article hanging device into the wall surface. With this form of attachment, the wall article will always remain parallel to the surface of the piece of furniture.

As such, an invention has been disclosed in terms of preferred embodiments thereof which fulfill each and every one of the objects of the present invention as set forth hereinabove and provides a new and improved method of paralleling hanging wall articles with a piece of furniture and a paralleling device therefor.

Of course, various changes, modifications and alterations from the teachings of the present invention may be contemplated by those skilled in the art without departing from the intended spirit and scope thereof. Accordingly, it is intended that the present invention only be limited by the terms of the appended claims.

I claim:

1. A paralleling system comprising:
   a) a bubble level;
   b) means for supporting said bubble level;
   means for removably inserting said supporting means between a frame surrounding a wall article and a portion of one of the wall article surrounded by the frame and a transparent material covering said wall article and for adjusting the bubble of the bubble level to a free floating stationary state which corresponds to a horizontal inclination of a surface of a piece of furniture so that the wall article frame can be paralleled to said surface by mounting the wall article frame on a wall surface above said surface of said piece of furniture at said horizontal inclination, the paralleling system further comprising the frame surrounding the wall article, wherein the removably inserting means device wedged between the wall article and the frame.

2. The paralleling system of claim 1, wherein said supporting means comprises a sheet material with a cut out portion along an edge thereof, the cut out portion separating a pair of tabs, each tab sized to fit within a recess at each end of the bubble level so that the bubble level is positioned between the tabs and in the cut out portion.

3. The paralleling system of claim 1, wherein the removable inserting means comprises a sheet material sized in thickness to be able to be inserted between the wall article frame and the portion of one of the wall article and the covering of the wall article.

4. The paralleling device of claim 1, wherein the sheet material is hour glass in shape with a top and bottom, the cut out portion being formed in the bottom of the hour glass shape.

5. A method of paralleling a wall article to a surface of a piece of furniture comprising the steps of:
   a) providing a wall article and a piece of furniture;
   b) providing a paralleling device comprising:
      i) a bubble level;
      ii) means for supporting said bubble level;
      iii) means for removably inserting said supporting means between a frame surrounding a wall article and a portion of one of the wall article surrounded by the frame and a transparent material covering said wall article and for adjusting the bubble of the bubble level to a free floating stationary state which corresponds to a horizontal inclination of a surface of a piece of furniture so that the wall article frame can be paralleled to said surface by mounting the wall article frame on a wall surface above said surface of said piece of furniture at said horizontal inclination;
   c) inserting said paralleling device between said wall article frame and a portion of one of the wall article or the transparent material covering said wall article;
   d) placing said wall article on the surface of the piece of furniture and adjusting said paralleling device so that the bubble thereof is in a free floating stationary state; and e) attaching the wall article to a wall surface with the bubble in the free floating stationary state so that the wall article is parallel to the surface of the piece of furniture.

6. The method of claim 5, wherein the bubble level has a pair of sight lines and the adjusting step further comprises positioning the bubble between the sight lines to determine the free floating stationary state.

7. The method of claim 5, wherein the step of providing the paralleling device further comprises a sheet material with a cut out portion along an edge thereof, the cut out portion separating a pair of tabs, each tab sized to fit within a recess at each end of the bubble level so that the bubble level is positioned between the tabs and in the cut out portion.

8. The method of claim 5, wherein the step of providing the paralleling device further comprises a sheet material sized in thickness to be able to be inserted between the wall article frame and the portion of one of the wall article and the covering of the wall article.

9. The method of claim 5, wherein the step of providing the paralleling device further comprises providing the sheet material in hour glass shape with a top and a bottom, the cut out portion being formed in the bottom of the hour glass shape.

10. The method of claim 5, wherein said wall article is attached to the wall surface using a wall article hanging device comprising:

a) an elongated plate having an uppermost and a lower edge;

b) means for rigidly and flushly attaching said elongated plate to a rear surface of said article; and c) at least a pair of spaced first prongs integrally formed at opposite ends of the elongated plate and extending outwardly from said elongated plate, each said first prong having an upper and a lower planar face, said upper and lower planar faces decreasing in width from said elongated plate to a terminating tip, said tip being angled downwardly towards said lower edge such that each said lower planar face forms an acute angle with respect to a transverse section of said elongated plate, said first prongs in opposing relationship with said means for rigid and flush attachment and designed for penetration of and attachment to said wall.

11. A paralleling device comprising:

a) a bubble level;

b) means for supporting said bubble level;

c) means for removably inserting said supporting means between a frame surrounding a wall article and a portion of one of the wall article surrounded by the frame and a transparent material covering said wall article and for adjusting the bubble of the bubble level to a free floating stationary state which corresponds to a horizontal inclination of a surface of a piece of furniture so that the wall article frame can be paralleled to said surface by mounting the wall article frame on a wall surface above said surface of said piece of furniture at said horizontal inclination, the means for inserting and adjusting further comprising a flexible sheet material, the flexible sheet material having exposed front and back surfaces, the exposed front and back surfaces forming a single edge sized in thickness to be inserted between the wall article frame and one of the transparent covering or the wall article to permit adjusting of the bubble level for said paralleling, wherein the sheet material having a cutout receiving the bubble, the cutout including a pair of opposing tabs, each tab sized to engage a recess in an end of the bubble level, the tabs holding the bubble in place.

* * * * *